June 28, 1960  B. E. ANDERSON ET AL  2,942,792
SORTING OF SCRAP METAL
Filed July 30, 1957  4 Sheets-Sheet 1

INVENTORS
Biard E. Anderson
Waldo C. Larson
BY
E. J. Schaffer

June 28, 1960  B. E. ANDERSON ET AL  2,942,792
SORTING OF SCRAP METAL

Filed July 30, 1957 4 Sheets-Sheet 2

INVENTORS
Biard E. Anderson
Waldo C. Larson
BY E. J. Schaffer

INVENTORS
Biard E. Anderson
Waldo C. Larson
BY E. J. Schaffer

June 28, 1960    B. E. ANDERSON ET AL    2,942,792
SORTING OF SCRAP METAL
Filed July 30, 1957    4 Sheets-Sheet 4

INVENTORS
Biard E. Anderson
Waldo C. Larson
BY
E. J. Schaffer

United States Patent Office 2,942,792
Patented June 28, 1960

2,942,792
SORTING OF SCRAP METAL

Biard E. Anderson, Salt Lake City, Utah, and Waldo C. Larson, Birmingham, Mich., assignors to American Smelting and Refining Company, New York, N.Y., a corporation of New Jersey Filed July 30, 1957, Ser. No. 675,200

5 Claims. (Cl. 241—14)

This invention relates to the sorting of composite scrap metal. More particularly, it relates to method and apparatus for sorting non-ferrous composite scrap metal, and especially to the sorting of composite aluminum scrap.

The term "composite scrap metal" comprehends scrap metal comprising physically contaminated mixtures of metal castings or wrought shapes. Automobile engine pistons, foil, pipes, pipe fittings, boxes, washing machine tubs, toys, and utensils of various kinds such as kitchen utensils, tools and the like, which have been wrought from sheet metal or cast as such, are typical of the physical condition of such scrap and the sizes and shapes encountered therein. Such scrap may arise as rejects or discards during manufacture or as worn out or obsolete parts.

Although it is comparatively easy to hand-sort the composite scrap encountered in the secondary metals industry into segregated shapes and sizes, it has not been possible heretofore to sort such scrap satisfactorily according to composition. At best, it could be sorted only roughly according to composition by hand or by the other methods heretofore available, and this was particularly true of scrap which is a physical mixture of different metals or alloys having the same or similar color. Such difficulty of sorting according to composition is especially true of light colored or so-called "white" colored metals, particularly aluminum scrap. Consequently, composite scrap purchased by a secondary metals smelter as being scrap of a certain metal or alloy, for example composite aluminum scrap, varies from batch to batch as to the size and shape of the scrap in a batch as well as the amounts of other metals and other constituents which are either or both physically mixed or physically attached to the metal intended to be purchased. Moreover, as indicated above, such purchased composite scrap comprises relatively large shapes, most of which, if not all, are larger and usually substantially larger than 8 inches in maximum dimension.

The problem of sorting composite scrap is further illustrated by composite aluminum scrap of the aforementioned typical commercial shapes. Aluminum engine pistons, for example, may have such foreign constituents attached thereto as either or both steel piston rings or a steel piston rod pin. Cast or wrought aluminum washing machine tubs may have attached thereto either or both a steel drive shaft or iron or stainless steel nuts and bolts attached to a tub flange or flanges. Wrought or cast aluminum pots or pans may have wooden handles attached thereto by an ordinary steel or stainless steel member. Other aluminum utensils, toys and tools may likewise be assemblies of aluminum parts with other parts of different composition such as magnesium, steel, zinc, solder, brass, bronze, plastic, rubber, wood and the like. In addition, even though the scrap had been previously sorted by the procedures, such as hand sorting, which are available to the industry, the aluminum scrap contained physically mixed therewith shapes which contained no aluminum—for example, nuts, bolts, nails, zinc-die cast toys, steel pots and pans in the case of utensil scrap, rubber, wood, dirt, etc. Thus, in addition to aluminum and aluminum alloys, the composite aluminum scrap purchased by the secondary metals smelter is physically contaminated with other metal and other constituents, some of which are heavier and some of which are lighter than the intended aluminum or aluminum metal base.

In the past, many attempts have been made without notable success to enhance the quality of the secondary metal recovered from composite scrap. Thus, for example, for want of a better procedure in the case of composite aluminum scrap, it is the practice on the part of the secondary metal smelter to further hand sort the scrap and to pass it through a magnetic separator to remove the loose non-magnetic and magnetic contaminants physically mixed in the scrap. Regardless of the degree of care exercised, it is not possible adequately to remove such loose physical contaminants and especially the loose non-magnetic contaminants. Moreover, such procedures are completely ineffective where the contaminants are physically attached to the aluminum. After thus sorting the scrap, it is then melted down in a so-called "sweating process" in which an attempt is made to selectively melt the aluminum away from the metallic contaminants still mixed therewith. While the sweating procedure is somewhat effective in separating the higher melting contaminants physically present in the scrap, it is not sufficiently effective to produce molten aluminum which has a sufficiently low content of such physically unremoved contaminants, particularly zinc, lead and tin. Although it is possible to purify the thus recovered molten aluminum of at least some of such contaminants by metallurgical procedures, such procedures are in general prohibitive as to cost. Consequently, in most instances the molten aluminum obtained from composite scrap is diluted with relatively pure aluminum to produce therefrom an aluminum product having a desired or acceptable composition.

The principal object and advantage of the present invention is that it provides method and apparatus for sorting composite scrap, which overcome the aforementioned difficulties. Another object and advantage of the invention is that it provides method and apparatus for separating the physically attached contaminants in the scrap as well as the contaminants which are merely physically mixed with the scrap. A further object and advantage of the invention is that it affords method and apparatus for improving or upgrading the quality of composite scrap, particularly composite light metal scrap and especially composite aluminum scrap. These and other objects and advantages of the invention will become apparent from the following detailed description thereof.

Broadly in one aspect, the invention comprehends apparatus for sorting composite scrap metal which comprises in combination a hammer mill, which for best results possesses impact and cutting members, for reducing the scrap to a mixture comprised of fractured and torn fragments of reduced size and shape, and gravity separation means to separate the thus prepared fragments into a plurality of fractions of different specific gravity.

In arriving at the invention in the course of experiments conducted with composite aluminum scrap, it was found that the individual pieces of the scrap, depending upon their shape, would display a low apparent specific gravity which, particularly in a liquid separating medium and because of air entrapment, would effectively prevent a satisfactory separation of the contaminants which were merely physically mixed with the scrap. Also, while this difficulty could be overcome at least to some extent by changing the shape of such pieces as by compressing them into shapes which would behave more closely to their true specific gravity, any such procedure could not effectively separate the aluminum from contaminants which were physically attached thereto.

Unexpectedly, however, it was discovered that when the composite aluminum scrap was passed through a hammer mill provided with impact and cutting members which reduced the scrap to a mixture of fractured and torn fragments, substantially all of which were less than about 8 inches in their maximum dimension, the thus prepared scrap when subjected to gravity separation could be separated into a fraction which was lighter than aluminum, a fraction which was heavier than aluminum, and an aluminum fraction which was substantially free of physical contaminants.

Further study and experimentation revealed the unexpected results that, in thus preparing the scrap, it was not only reduced to fragments having shapes which, during a gravity separation, were capable of behaving according to, or substantially according to, the true specific gravity of the fragment but also that the contaminants physically attached to the aluminum were separated therefrom as fragments which behave according to the specific gravity of the contaminant or sufficiently close thereto to be capable, during gravity separation, of being separated from the aluminum fragments which were free of physically attached contaminants. It was also found quite unexpectedly that the contaminants physically attached to the original scrap were separated therefrom as fragments composed of the contaminants or as fragments comprised of the contaminants containing attached aluminum, and that the true specific gravity of substantially all of the latter fragments were sufficiently different from the aluminum fragments and were sufficiently close to that of the contaminant so as to enable them to be separated from the aluminum fragments by gravity separation procedures.

Broadly in another aspect, the invention comprehends a method of sorting composite scrap metal containing a physical contaminants, including contaminants physically attached to the scrap metal, which involves fracturing and tearing the scrap into fractured and torn fragments in a hammer mill whereby said scrap is reduced to a mixture of fragments which are composed of the scrap metal, contaminants, and contaminants having scrap metal fragments attached thereto, and then separating by gravity from the thus prepared scrap fragments composed of contaminants and contaminants having scrap metal fragments attached thereto.

The invention is most useful for sorting composite aluminum scrap. For practical purposes, it is essential that composite aluminum scrap be reduced to fragments, substantially all of which are less than about 8 inches in their maximum dimension in order to obtain commercially acceptable sorting results. For best results, the hammer mill for reducing the aluminum scrap should be provided with impact and cutting members. Composite aluminum scrap which has been properly prepared in a hammer mill has the following typical size distribution. A preponderant proportion of the fragments, in their maximum dimension, is larger than about ½ inch and less than about 4 inches, a major proportion of the fragments is about 1 to 3 inches in size and a substantial proportion is about 2 inches in size.

The fragmented scrap may be subjected to gravity separation in any gravity separating apparatus, for example in pans, rockers, shaking tables, vanners, sluices, classifiers, jigs, and sink-float apparatus. However, the various procedures in the various apparati are not equivalent for purposes of the present invention in that they are not all equally effective in separating the fragments according to their specific gravity or range of specific gravities. In general, gravity separation in a liquid such as water is preferred to gravity separation in a non-liquid. Superior results are obtained by gravity separation employing a so-called heavy liquid, i.e. a liquid as such or a liquid medium comprising a suspension of solids (media) in a liquid, having a desired density above that of water. Jigging the mixture of fragments in a jig employing water and especially jigging in a heavy liquid affords better results than are obtainable by other procedures with the exception of sink-float procedures. In general, such jigging which involves agitating the mixture of fragments in the liquid by placing the fragment mixture in a suitable container and either agitating the latter in the liquid or pulsing the liquid through the container until the fragments are separated into a plurality of superimposed layers which are then separated from each other, is disadvantageous in that large capacity apparatus is required and the demarkation between fractions is not desirably sharp.

Best results are obtained by the sink-float procedure. In this latter procedure a stream of the mixed fragments is fed onto a heavy liquid which has a suitable density between the densities of two desired fractions of the fragments in the fragment mixture. Upon entering the liquid the heavier fragments sink therein while the lighter fragments float on or adjacent the liquid surface, and the thus separated fractions are separately removed from the liquid. Any suitable liquid or mixture of liquids or suspension of a solid in a liquid may be used. For example, the sink-float liquid may be a heavy hydrocarbon or mixtures thereof, an aqueous solution, or a suspension of finely divided solid media, especially solids having a high density such as galena, ferrosilicon, or magnetite. Preferably, the liquid for the sink-float procedure is a liquid suspension of controlled density obtained by suspending a suitable amount of a suitable solid in water. Most preferably and especially for use in connection with composite aluminum scrap, the sink-float liquid is a water suspension of ferrous material such as finely divided magnetite or ferrosilicon or both.

In conducting the sink-float separation, especially in a liquid of the suspension type, it is important that the fragments be fed onto the liquid so that they enter the latter substantially individually, thereby avoiding mechanical entrapment of sink fragments with float fragments and vice versa. Thus, by avoiding the introduction of agglomerated fragments into the liquid, each fragment has the opportunity to sink or float in the liquid as dictated by its specific gravity with respect to that of the liquid.

It was discovered, however, that the sojourn time of the fragments in the body of the sink-float liquid, and especially of the float fragments, should be relatively closely controlled, when employing a suspension-type heavy liquid, in order to obtain best results in separating the float from the sink fraction in the prepared scrap. Thus, it has been found that composite scrap prepared in accordance with the invention contains varying percentages of irregular shaped fragments in which the heavy liquid may become entrapped and held in relative quiescence. Where this occurs, the suspended solids in the entrapped liquid tend to settle therefrom, thereby causing the fragments to behave with a false high specific gravity. Fragments of foil, crimped pieces of tubing, indented or cup-shaped fragments formed or broken as such from the composite scrap, are typical of such liquid entrapping fragments. Accordingly, when the sink-float separation is used with a suspension-type liquid, the sojourn time of the float fraction in the liquid is controlled to a value below that at which appreciable amounts of the liquid entrapping fragments in the float begin to enter the sink fraction.

The sojourn time in which appreciable quantities of liquid-entrapping float fragments begin to sink in the suspension liquid will depend, among other things, on the stability of the suspension and the difference between the specific gravity of the suspension liquid and the true specific gravity of the liquid-entrapping fragments. In general, and especially in floating aluminum comprising fragments from heavier fragments in prepared aluminum composite scrap or in floating lighter fragments from the aluminum fragments, and particularly in a water suspension of finely divided ferrosilicon or magnetite or mixtures thereof, the sojourn time of the float in the body of the sink-float liquid should not exceed about 10 seconds. Also, to afford sufficient time to effect separation the sojourn time should not be less than about 1 second. Within this range, a sojourn time of about 1 to 8 seconds is preferred and best results are obtained with a sojourn time in the range of 2 to 5 seconds. The linear distance travelled by the float fragments on or adjacent the surface of the sink-float liquid from their point of entry into the body of the liquid and the point of exit therefrom will depend upon the linear velocity of the liquid through the sink-float apparatus. In general and especially with the above sojourn time, the distance between these two points for the float fraction should be in the range of about 1 to 6 feet, preferably in the range of about 1.5 to 4.5 feet, and for best results about 2 to 3 feet, particularly in sorting composite aluminum scrap prepared in accordance with the invention.

In sorting composite aluminum scrap prepared in accordance with the invention, it has been found that the heavy non-aluminum fragments and heavy fragments having aluminum attached thereto are effectively sunk by the use of a sink-float liquid having a density in excess of 2.7 grams per cc. Good results are obtained in separating such heavier fragments from aluminum and lighter fragments by the use of a liquid having a density in the range 2.8 to 3.5 grams per cc. Best results are obtained with a liquid of a density in the range 3.0 to 3.2 grams per cc. It has been found likewise that light non-aluminum fragments and light fragments having aluminum attached thereto are effectively separated from the aluminum and heavier fragments by the use of a sink-float liquid having a density below 2.5 grams per cc., particularly in the range of about 1.8 to 2.5 and especially in the range 2 to 2.2 grams per cc. Any desired temperature between the freezing point and the boiling point of the fluid may be used in conducting the sink-float procedure. With the preferred water suspension of magnetite or ferrosilicon or mixtures thereof, the temperature of the fluid preferably is in the range 35 to 200° F. Within this range a temperature in the range 40 to 100° F. is more preferred and a temperature in the range 50 to 80° F. is most preferred.

In practicing the invention with a suspension-type liquid in the sink-float procedure, it has been found that superior results are obtained, especially in sorting the liquid-entrapping fragments in prepared composite aluminum scrap, by introducing the scrap together with the heavy liquid onto a body of the latter during the removal of the light fragments in the prepared composite scrap and by introducing the scrap separately onto the body of the fluid during the removal of the heavy fragments from the composite scrap. Preferably, in sorting composite aluminum scrap in accordance with this procedure, the dry prepared composite scrap is first fed onto a body of heavy liquid having specific gravity above 2.8 grams per cc. to sink the heavier fragments in the liquid and to recover the aluminum and lighter fragments in the float. Subsequently the light fragments in the float are separated therefrom in a body of a second heavy liquid having a density below 2.5 grams per cc., by flushing the float onto the body of the second heavy liquid with a recycled stream of the latter.

It has been found in practicing the invention with a suspension-type liquid, that the suspended particles of the liquid tend to adhere to the fragments when the latter are removed from the liquid, even after the removed fragments have been carefully washed. Removal or reduction of the amount of such adhering solids from the fragments is highly desirable, especially where the adhering solids are capable of contaminating the sorted fragments when the latter are melted in a furnace for subsequent casting into ingots. Thus, in sorting composite aluminum scrap using a water suspension of ferrosilicon or magnetite or both, the solids adhering to the aluminum fragments may increase the iron content of the aluminum ingot, especially when a flux is used during the melting of the sorted aluminum fragments. It has been found, however, that adequate removal of such adhering solids can be effected by drying the fragments and then agitating the dried fragments to shake adhering solids therefrom. Such drying and agitation of the dried fragments may be most advantageously accomplished in a rotatory drier wherein the fragments are agitated during and after the drying operation.

The invention is further illustrated in the accompanying drawings and in the following examples. It should be understood, however, that the drawings and examples are given for purposes of illustration and that the invention in its broader aspects is not limited thereto.

Figure 1:
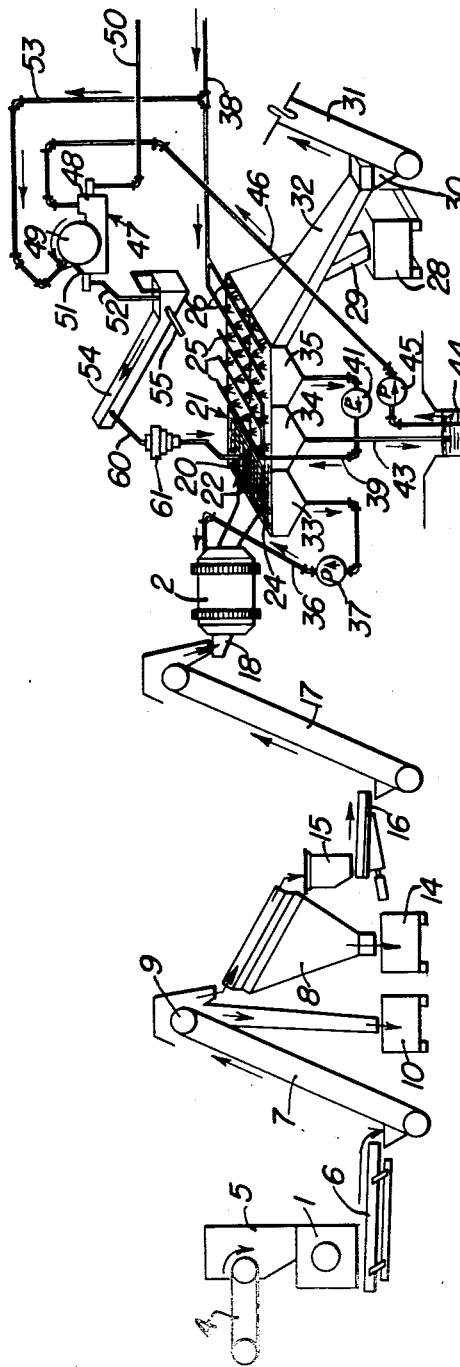
Fig. 1 is a flow sheet, partly diagrammatic in nature, illustrating the best mode of practicing the invention.
Figure 1:
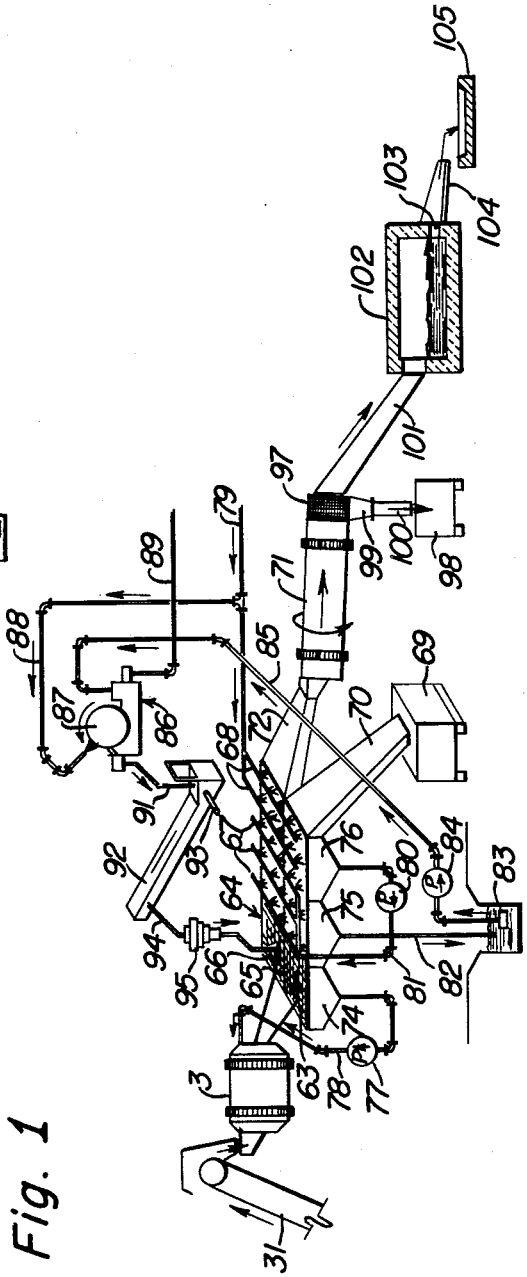

Referring now to the drawings, there is shown in Fig. 1 a hammer mill 1 in combination with sink-float drums 2 and 3. For convenience, the various drawings will be described in connection with the sorting of composite aluminum scrap, using a heavy liquid comprising a water suspension of ferrosilicon or magnetite or mixtures thereof. It will be understood, however, that composite scrap other than composite aluminum scrap may be sorted in the procedures and apparatus of the drawings and that other heavy liquids may be used in connection with the sorting of the aluminum scrap as well as in the sorting of other types of scrap.

Composite aluminum scrap is fed onto conveyor 4 which delivers it to hopper 5 of hammer mill 1. The scrap passes through the hammer mill onto a suitable conveyor 6 which, as illustrated, may be a vibrating conveyor. The latter delivers the fragmented scrap to elevator 7 which may deliver the scrap to screen 8, which may be a vibrating screen, for removing fines. The pulley 9 of elevator 7 may, if desired, be a magnetic pulley for separating from the scrap magnetic fragments which are capable of being held to the elevator by the magnetic pulley; said fragments, as they are moved away from the influence of the magnet, being dropped into tote box 10.

In removing fines, any suitable screen to remove undesired fines may be used. Preferably the screen is a standard 8-mesh screen having openings about ⅛ inch in dimension to remove fines up to ⅛ inch in size. Removal of fines is advantageous both because fines are not conveniently melted with the sorted scrap when the latter is melted and cast, and also because fines may adversely affect the density of the heavy liquid in the subsequent sink-float separation.

The fines passing through screen 8 are collected in tote box 14. The scrap remaining on screen 8 is fed into surge hopper 15 from whence it is fed by a suitable conveyor 16, which may be a vibrating conveyor, which delivers the scrap to elevator 17 which feeds the scrap to sink-float drum separator 2.

The scrap falls from elevator 17 onto vibrating chute 18 which delivers the scrap fragments substantially individually onto the body of the heavy liquid maintained in drum 2. The density of the liquid in the drum is maintained at a desired value below the heavy fragments in the scrap which, in the case of composite aluminum scrap, is above 2.7 and below 6 grams per cc. preferably in the range 2.8 to 3.5 grams per cc. and for best results in the range 3.0 to 3.2 grams per cc. The sink, containing the heavy non-aluminum fragments and such fragments having aluminum attached thereto, together with heavy liquid, is delivered by the drum to side 20 of a screen 21 which preferably is a vibrating screen provided with partition 22. The float (aluminum and lighter fragments) together with heavy liquid is delivered by the drum to side 24 of the screen 21. The sink and the float fragments pass down their respective sides of the screen under a plurality of banks of washing sprays 25 and 26. The washed sink fragments are passed from the screen by means of chute 29 to tote box 28 and may be discarded from the process. The float fragments are passed from the screen by chute 32 to hopper 30 of elevator 31 and are delivered by the latter to sink-float drum 3 for further treatment.

Hoppers 33, 34 and 35 are provided beneath screen 21. The heavy liquid flowing with the sink and float fragments from drum 2 onto the initial portion of the screen above hopper 33 passes through the screen into hopper 33, from where it is recycled by means of pipes 36 and pump 37 directly back to the body of heavy liquid in drum 2. Thus, a continuous stream of heavy liquid is recycled into and out of the drum and the body of liquid therein. In addition to washing the float from the drum, such recycling of the heavy liquid maintains the body fo the liquid at the desired density by keeping the finely divided media solids of the liquid fully suspended in the water.

The fragments on screen 21 may be washed with fresh water supplied to sprays 26 by conduit 38 connected to a suitable source (not shown). The wash water from sprays 26 may be collected in hopper 35 and pumped therefrom through conduit 39 by pump 41 to sprays 25 which provide the initial washing for the fragments. The wash water from sprays 25 which collects in hopper 34 may contain an appreciable amount of the ferrous solid media which have been used to provide the desired density in the heavy liquid medium used in drum 2.

The solid media contained in the wash water in hopper 34 may be recovered and returned to the process by passing it via conduit 43, pump sump 44, pump 45 and conduit 46 to a suitable magnetic separator 47. The latter may comprise a suitable tank 48 having a rotatable magnetic drum 49 suitably mounted therein, to which the ferrous media solids are attached and held, thereby being removed from the wash water. The residual wash water which may contain non-magnetic impurities such as dirt, etc. overflow from tank 48 and may be passed to the sewer by conduit 50. The media solids adhering to drum 49 may be washed thereon with fresh water from conduit 53 and may thereafter be removed from the drum by suitable means, such as scraper 51 mounted on the back of tank 48. The thus reclaimed wet media solids may be passed by chute 52 to a suitable dewatering means such as densifier 54 which may comprise a settling tank provided with an inclined screw elevator, from which the supernatant water may be discharged through outlet pipe 55. The dewatered media discharged from densifier 54 may be passed via conduit 60, which may be provided with demagnetizing coil 61, to hopper 33. Demagnetization of the ferrous solids by coil 61 is desirable to prevent subsequent flocculation of the solids in the heavy liquid.

The float from drum 2, which contains the aluminum fragments together with the lighter non-aluminum fragments and fragments of this latter type containing aluminum attached thereto, is delivered by elevator 31 to sink-float drum 3 wherein such light fragments are separated as the float and the aluminum fragments are the sink. The density of the heavy liquid in drum 3 is maintained at a desired value above the light and below the heavy fragments therein. In the case of aluminum scrap, the heavy liquid medium is maintained at a density below about 2.5 grams per cc. and preferably above 1.8 grams per cc., and for best results in the range of 2.0 to 2.2 grams per cc. Also for best results, the scrap for drum 3 is washed into the drum with recycled heavy liquid medium. The sink-float procedure for drum 3 and the apparatus associated therewith is otherwise the same as that for drum 2.

Thus the scrap fragments are delivered substantially individually onto the body of heavy liquid in drum 3. This may be accomplished by washing the scrap into the drum with the recycled heavy liquid without the use of a vibrating chute although preferably a chute of the latter type is also used. The float is delivered from drum 3 to side 63 of vibrating screen 64 which is provided with partition 65 and the sink is delivered to side 66 of the screen. The sink and the float passing down their respective sides of the screen are washed by a plurality of banks of sprays 67 and 68. The washed float fragments leaving the screen are delivered to tote box 69 by chute 70 and may then be discarded from the process. The washed sink fragments are passed to rotatory drier 71 by a suitable chute 72.

The screen 64 may also be provided with hoppers 74, 75 and 76. The heavy liquid passing into hopper 74 is recycled via pump 77 and conduit 78 to drum 3, entering the latter, as shown, on the inlet chute of the drum along with the scrap. The scrap on screen 64 may be washed with fresh water from sprays 68 fed by conduit 79 connected to a suitable source of water (not shown). The wash water passing into hopper 76 may be passed through sprays 67 via pump 80 and conduit 81. The ferrous media solids contained in the wash water in hopper 75 may be recovered by passing the wash water via conduit 82, pump sump 83, pump 84, and conduit 85 to magnetic separator 86. The media adhering to the magnetic drum 87 may be washed thereon with water from conduit 88. The residual wash water overflowing from magnetic separator may be passed to the sewer via conduit 89. The media solids adhering to drum 87 may be removed therefrom by a scraper and passed via chute 91 to densifier 92. The water, removed from the solids dewatered in the densifier, may be removed from the latter by conduit 93. The dewatered solids may be passed from the densifier through conduit 94 which may be provided with demagnetizing coil 95 and returned to hopper 74. Either or both make-up water from any source or media solids as required to maintain the density of the heavy liquid medium in drums 2 and 3 may be added to hoppers 33 and 74 respectively.

The drier 71 may be a conventional inclined rotatory drier provided with a conventional screening section 97 at its lower end and supplied with hot air from a suitable source (not shown). The wet sorted aluminum fragments introduced into the drier are dried in the upper portion of the drier before they reach the screening section 97 which is provided with a screen of suitable mesh size to screen the media solids out of the scrap fragments. In the latter section the media solids are shaken off the dried fragments by the agitation provided by the rotation of the drier. The thus removed media solids which pass through the screen are collected in tote box 98 after passing through hopper 99 and conduit 100, and may be re-used in the process. The dried and sorted aluminum fragments leaving the drier 71 are delivered by chute 101 or any other suitable means to furnace 102 where they are melted down preferably in the presence of a suitable flux such as a chloride or fluoride flux or mixtures thereof. The molten metal is then tapped from the furnace through tap hole 103 and is delivered by launder 104 to mold 105 where it is cast into an ingot as a product from the process.

If desired, any of the sink or float fractions obtained from drums 2 and 3 may be subjected to further gravity separation steps. Thus, for example, the sink from drum 3 either before or after it has been dried may be subjected to a similar sink-float separation to separate fragments composed of aluminum from those composed of alloys of aluminum by using a heavy liquid of an appropriate density between that of the aluminum fragments and that of the alloy fragments. The latter may then be further separated into fragments of different aluminum alloys by the use of a heavy liquid of suitable density. Also, instead of the sequence of sink-float step illustrated in Fig. 1, the sequence may be revised to first float the light fragments from the prepared scrap and then subject the sink from such a first step to another sink-float step to sink the heavier fragments from the aluminum fragments.

Figure 2:
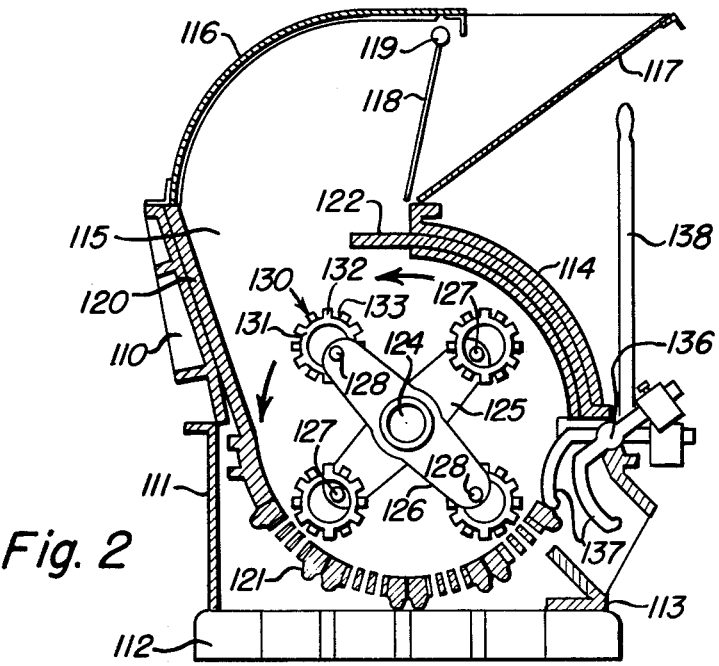
Fig. 2 is a view in cross-section of the preferred hammer mill for the invention.

The preferred hammer fill is illustrated in greater detail in Fig. 2. As shown in this figure, the hammer mill is provided with a suitable housing illustrated by back members 110 and 111, bottom member 112, front members 113 and 114, and side wall member 115. Mounted on the housing is a hood 116. The hood is provided with a feed chute 117 and a trap door 118 mounted on the hood by shaft 119. Mounted within the housing are back plate 120, a curved sectional grate 121, and curved foreplate member 122.

Figure 3:
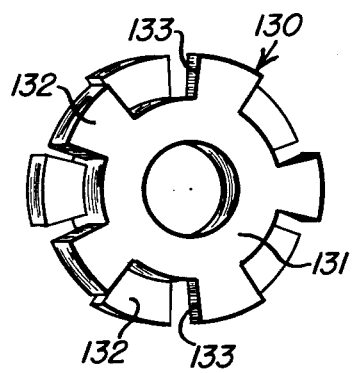
Fig. 3 illustrates the hammer element of the hammer mill of Fig. 2.

Shaft 124 which is suitably mounted on journals on the housing side walls extends through the housing and is drivingly connected to a suitable motor means (not shown). Fixedly mounted on shaft 124 is a pair of arms 125 with one arm adjacent one side 115 of the housing and the other arm adjacent the other housing side wall. Similarly mounted on shaft 124 is another pair of arms 126 at right angles to arms 125. Attached to arms 125 adjacent each end thereof are pins 127 which extend from one arm to the other. Similarly attached to arms 126 are pins 128. A plurality of hammer members 130, extending from one arm to the other, are mounted closely adjacent each other on pins 127 and 128; each hammer member being a wheel-like member having a circular rim portion 131 of a relatively large inside diameter as compared with the diameter of pins 127 and 128 with a plurality of hammer elements 132 having relatively dull edges 133, projecting from the rim portion as shown in Fig. 3. Pivotally mounted on shaft 136, which is attached to housing member 114, are a plurality of weighted closure members 137 adapted to yieldingly close the space between member 114 and grate 121. The shaft 136 may also be provided with handle 138 suitably attached thereto for moving the members 137.

In operation the composite scrap fed into the mill on chute 117 is fragmented by the hammering and cutting action of the hammer members 130 acting against back plate 120 which functions as an anvil. The shaft 124 is revolved in the direction indicated by the arrow at a high rate, for example on order of magnitude of 600 to 2000 revolutions or more per minute, so that the scrap is fragmented predominantly by impact action. The scrap fragments then fall through the openings in grate 121 and then through the openings provided in housing member 112 onto conveyor 6 shown in Fig. 1. Fragments which are too large to pass through grate 121 are carried by the hammer elements to weighted members 137 which yield and permit such fragments to be ejected from the mill. Such large fragments may be returned to the mill or they may, if desired, be discarded from the process.

Figure 4:
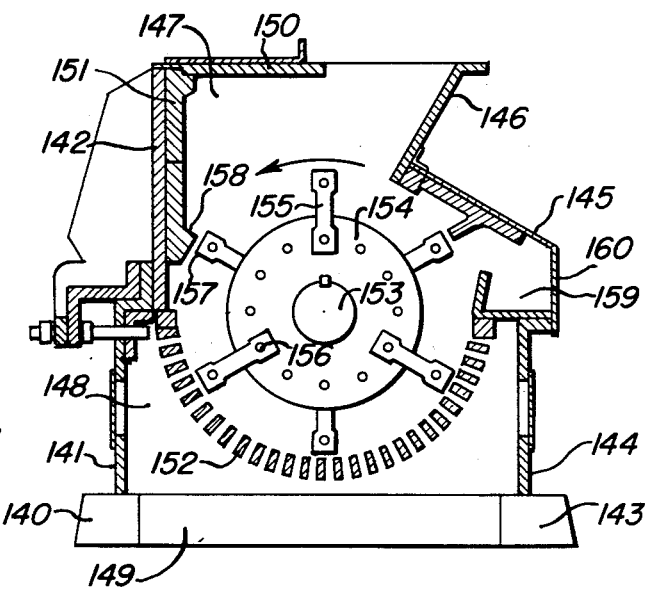
Fig. 4 is a view in cross-section of an alternative hammer mill.

An alternative hammer mill for the process is illustrated in Fig. 4 which shows a mill housing having back wall members 140, 141 and 142, a front wall of members 143, 144, 145 and 146, side walls of members 147, 148 and 149, and a top 150. Back plate 151 is mounted on wall 142 and grate 152 is mounted on walls 141 and 144. Shaft 153 which is suitably mounted on journals on side walls 148 extends through the housing and is connected to a motor (not shown). A plurality of disks 154 are mounted and keyed onto shaft 153 in spaced but closely adjacent relationship to each other. Each disk is provided with three hammer elements 155 which are spaced equidistant about the periphery of the disk and mounted thereon by pins 156, each hammer element being free to swing about its mounting pin.

In operation the shaft 153 is also revolved at a high rate on the order of magnitude of about 600 to 2000 or more r.p.m. Composite scrap fed into the mill is fragmented by the hammering and tearing action of hammer elements 155 acting against back plate 151. The fragmenting is largely accomplished by impact although the leading edge 157 of the hammer elements also affords a tearing and shearing action against the projecting portion 158 of back plate 151. The thus formed fragments then fall through the openings in grate 152 and may then be delivered to conveyor 6 shown in Fig. 1. Fragments which are too large to pass through the grate are carried beyond the grate and are thrown into trough 159 and may be received therefrom by removing cover plate 160.

Figure 5:
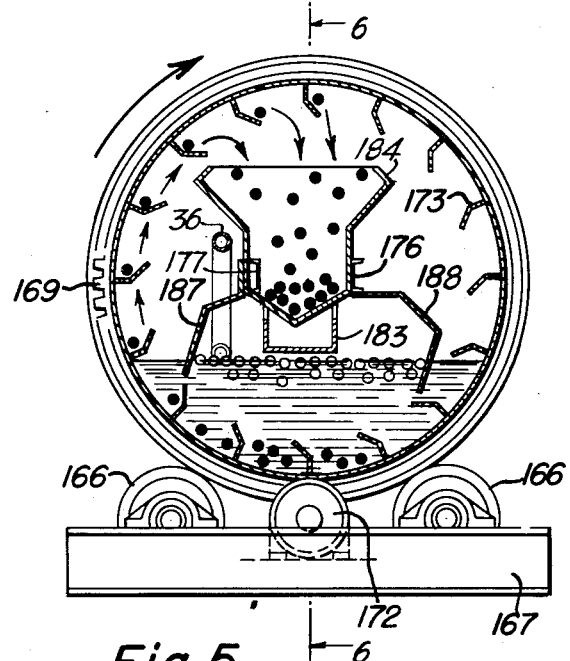
Fig. 5 is a cross-section view of the preferred sink-float apparatus taken along line 5—5 of Fig. 6 in the direction of the arrow.
Figure 6:
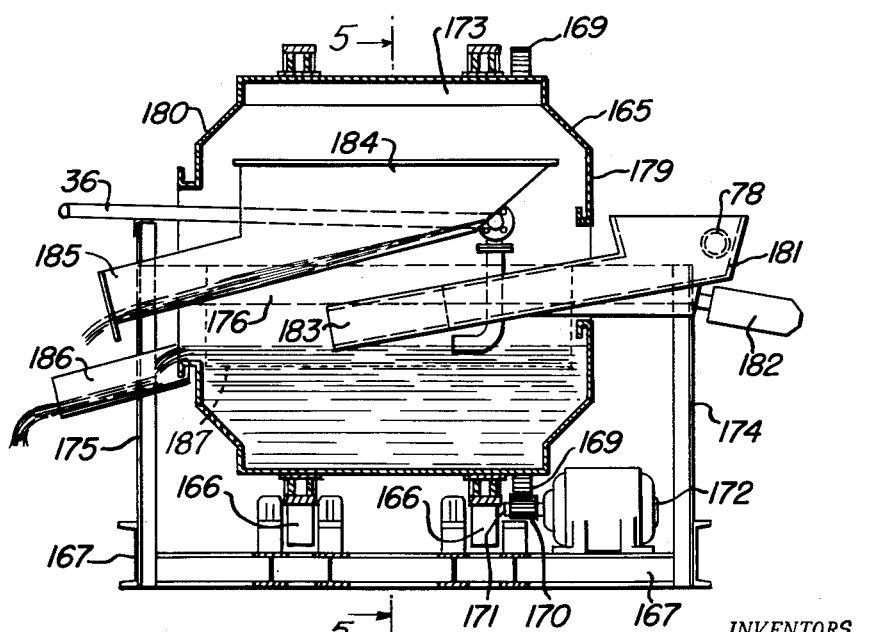
Fig. 6 is a view of the apparatus of Fig. 5 taken along the lines 6—6 of Fig. 5.

The sink-float drum separators of Fig. 1 are illustrated in greater detail in Figs. 5 and 6. The drum 165 rests upon and is supported by rollers 166 which, in turn, are mounted on foundation frame 167. Attached to the drum is toothed sprocket 169. Meshed with the sprocket is gear 170 mounted on shaft 171 of motor 172 which is attached to a suitable power source (not shown). Mounted about the inside periphery of the drum at spaced intervals are a plurality of longitudinal sink-lifter baffles 173.

Mounted on frame 167 is a support frame having upright members 174 and 175, and transverse members 176 and 177 which are disposed in the openings in the drum side walls 179 and 180 and extend through the drum. Vibrating chute 181 provided with conventional vibrating means 182 is mounted on the support frame with its delivery end disposed in the drum. The chute is provided with an extensible leg 183 to adjust the distance between end wall 180 of the drum and the discharge edge from the chute. Disposed in the drum and also mounted on the support frame is sink launder 184 having its discharge leg 185 extending through the opening in side wall 180 for discharging sink to the sink side 20 of screen 21 in the case of drum 2, and to the sink side 66 of screen 64 in the case of drum 3 of Fig. 1. Float launder 186 which is also attached to the support frame is disposed outside the drum to receive the stream of overflowing heavy liquid containing the float fragments and deliver it to the float side of the respective screen associated with the drum. Disposed within the drum are stationary longitudinal baffles 188 and 187 which are attached respectively to transverse supports 176 and 177. The baffles extend downwardly below the surface of the liquid in the drum for a sufficient distance to prevent float fragments from being removed by the sink lifter baffles 173. The lower edge of baffles 188 and 187 is disposed so as to just clear the upper edge of the sink lifter baffles. In drum 2, pipe 36 for recycling the heavy liquid from hopper 33 (see Fig. 1) extends into the drum and discharges directly into the body of the liquid preferably at or adjacent the liquid surface and in the direction of the discharge side of the drum. In drum 3, pipe 78 for returning the recycled heavy liquid discharges the liquid on chute 181.

In operation the drum is revolved at a relatively slow rate, for example about 4 r.p.m. The scrap fragments fed to the vibrating chute 181 are delivered substantially individually onto the surface of liquid by the chute. The proper sojourn time of the float fragments in the body of the liquid for the conditions existing in the drum is obtained by adjusting the distance between the discharge end of the drum and the lower end of extensible leg 183 by extending or retracting the latter. The float fragments are washed from the drum by the heavy liquid recycled through the drum and are discharged onto launder 186. The heavy fragments sink in the heavy liquid are removed therefrom by baffles 173 which discharge them to launder 184 as is illustrated in Fig. 5.

Figure 7:
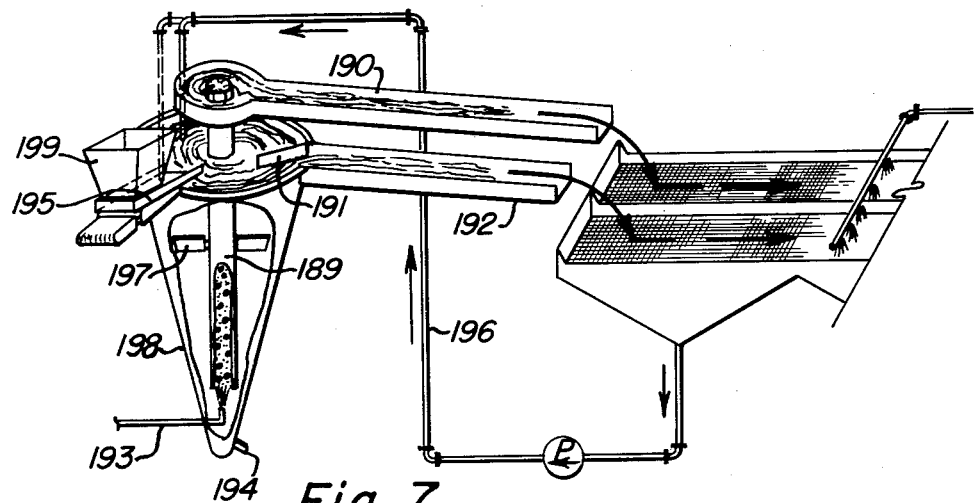
Fig. 7 is a view in perspective, partially broken away, of an alternative sink-float apparatus.

Alternative sink-float apparatus for practicing the invention is illustrated in Fig. 7 in which 198 is a cone-like tank provided with vibrating feed chute 199, air lift and agitator 189, sink launder 190, float baffle 191, float launder 192, air inlet pipe 193, and drainage outlet 194. Chute 199 may be moved about the tank or the feed leg 195 may be extended to control the linear length of the path of the float fragments on the surface of the liquid to provide the proper sojourn time for the float fragments in the body of the liquid. The recycled heavy liquid may be returned by pipe 196 directly to the body of the liquid as shown by the solid lines, or it may be fed onto leg 195 of the chute, as indicated by the dotted lines. Where the heavy liquid is a suspension of solids in a liquid such as water, stirrers 197 are provided which may be mounted on the shaft of the air lift and the latter may be rotated by suitable means (not shown) to assist in maintaining the solids in suspension. In operation, the float fragments introduced into the body of the liquid are carried by the latter to baffle 191 which deflects them into launder 192. The sink fragments are removed from the bottom of the tank by the air lift and are discharged into sink launder 190.

The invention is further illustrated by the following examples. Over a period of two weeks, composite aluminum scrap comprised of aluminum automobile pistons, washing machine tubs, kitchen utensils, etc. as received at the smelter were sorted by the procedure illustrated in Fig. 1. The amount of scrap treated daily varied from 11,500 pounds to 31,000 pounds. The hammer mill used was that illustrated in Figs. 2 and 3. The length of arms 125 and 126 from pin to pin was 2 feet; the diameter of the circular rim portion of the hammer member 130 was 6 inches; the openings in grate 121 were about 2 inches wide and 8 inches long; and the shaft 124 was rotated at about 1200 r.p.m. The mill reduced the scrap in one pass to fractured and torn fragments, substantially all of which, in their maximum dimension were under 8 inches, a preponderant proportion being about ½ inch to 4 inches, and a major proportion of the latter being about 1 inch to 3 inches with a substantial amount of 2 inch fragments.

The heavy liquid used for the sink-float steps in drums 2 and 3 was a water suspension of ferrosilicon and magnetite. The density of the liquid for the separation step in drum 2 was 3.0 to 3.2 grams per cc. and that of the liquid for the separation step in drum 3 was 2.0 to 2.2 grams per cc. The linear velocity of the heavy liquid through the drums was about 1 foot per second; the temperature of the heavy liquid averaged about 52° F. The sojourn time of the float in the drums was from 2 to 4 seconds; the linear length of the path from the end of the inlet chute to the edge of the exit side of the drum was about 3 feet.

The scrap was carefully hand sorted to remove contaminants before being fed to the hammer mill. The scrap from the hammer mill was passed over a 20-mesh standard screen to remove fines, and the scrap passing over the screen was passed through a magnetic separator before being subjected to the sink-float separation steps.

The sink obtained from the heavy liquid having a density of 3 to 3.2 grams per cc. varied from 1.85 to 3.31% of the weight of the charge, averaging 2.57%. It was found to be composed largely of brass, bronze, zinc, steel and minor amounts of copper, lead and tin. It was also found to contain substantial amounts of aluminum which in some instances amounted to 20 to 30%, by weight, of the sink. Physically, it was observed to contain an appreciable number of fragments having aluminum pieces physically attached thereto. The float from the liquid having a density of 2.0 to 2.2 grams per cc. varied from 3.5 to 8.8% of the weight of the charge, averaging 5.13%. It was found to be composed largely of magnesium. It was also observed that some of the fragments had aluminum physically attached thereto. The aluminum scrap remaining after the removal of the foregoing light and heavy fragments was dried and agitated in drier 71, and media solids averaging about 1% by weight of the metal charged to the drier were removed by screen 97 and recovered in tote box 100. So far as could be determined, the scrap recovered from the drier was substantially free of physical contaminants.

It will be noted that contaminants, amounting to as much as 12% of the charge and which could not otherwise be removed by the sorting procedures heretofore available to the art, were successfully removed by practicing the present invention. It will be noted further that the aluminum scrap recovered in practicing the invention is substantially free of physical contaminants.

What is claimed is:

1. In a process for enhancing the grade of light metal scrap recovered from composite light metal scrap involving subjecting said scrap to gravity separation in a water suspension of finely divided ferrous solids to recover a light metal portion from said scrap and melting the thus recovered portion, the improvement comprising drying and then agitating said recovered portion prior to melting same thereby removing therefrom finely divided ferrous solids adhering thereto.

2. In a process for enhancing the grade of aluminum recovered from aluminum scrap comprising a mixture of aluminum fragments and contaminant fragments which involves separating aluminum fragments from the mixture by gravity in a water suspension of finely divided ferrous solids selected from the group of ferrous solids consisting of ferrosilicon, magnetite and mixtures thereof, washing the thus separated aluminum fragments, and melting and casting the latter, the improvement which comprises drying the washed aluminum fragments and tumbling the dried fragments prior to melting same thereby removing therefrom finely divided ferrous solids adhering thereto.

3. A method of enhancing the grade of the light metal scrap recovered from composite light metal scrap containing physical contaminants, including contaminants physically attached thereto, which comprises reducing the composite scrap in a hammer mill to a mixture of fractured and torn fragments of different density substantially all of which in their maximum dimension are less than about eight inches with a preponderant amount of the fragments more than about ½ and less than about 4 inches and which mixture is comprised of fragments of the light metal, contaminant fragments, and contaminant fragments having fragments of the light metal attached thereto, subjecting said mixture to gravity separation in a water suspension of finely divided ferrous solids to recover light metal fragments from said mixture, drying and then agitating the recovered fragments to remove therefrom finely divided ferrous solids adhering thereto, and melting the thus dried and agitated fragments.

4. A method of enhancing the grade of aluminum recovered from composite aluminum scrap containing physical contaminants, including contaminants physically attached to the aluminum, which comprises reducing the scrap in a hammer mill to a mixture of fractured and torn fragments of different densities substantially all of which in their maximum dimension are less than about eight inches with a preponderant proportion of the fragments more than about ½ and less than about 4 inches and which mixture is comprised of aluminum fragments, contaminant fragments, and contaminant fragments having aluminum fragments attached thereto, subjecting the thus prepared mixture to sink-float separation in a water suspension of finely divided ferrous solids having a density greater than about 2.8 grams per cc., recovering the aluminum fragments floating on said water suspension, drying and then agitating the latter to remove therefrom finely divided ferrous solids adhering thereto, and melting the thus dried and agitated fragments.

5. A method of enhancing the grade of aluminum recovered from composite aluminum scrap containing physical contaminants, including contaminants physically attached to the aluminum, which comprises reducing the scrap in a hammer mill to a mixture of fractured and torn fragments of different density substantially all of which in their maximum dimension are less than about eight inches with a preponderant proportion of the fragments more than about ½ and less than about 4 inches and which mixture is comprised of aluminum fragments, contaminant fragments, and contaminant fragments having aluminum fragments attached thereto, introducing the fragments of the thus prepared mixture substantially individually onto a body of a water suspension of finely divided ferrous solids comprising ferrosilicon and having a density in the range of about 3 to 3.2 grams per cc., recovering from said water suspension the fragments that float on and adjacent the surface thereof, introducing said recovered fragments substantially individually onto a body of a second water suspension of finely divided ferrous solids selected from the group of ferrous solids consisting of ferrosilicon, magnetite and mixtures thereof and which second water suspension has a density in the range of about 2 to 2.2 grams per cc., recovering from said second water suspension the fragments which sink therein, the sojourn time of the float fragments in each of said water suspension bodies being in the range of about 1 to 10 seconds, the fragments recovered from said second water suspension being aluminum fragments which are substantially free of physical contaminants originally present in the scrap, washing the thus separated aluminum fragments with water, drying and then tumbling said washed aluminum fragments to remove therefrom finely divided ferrous solids adhering thereto, and melting the thus dried and tumbled aluminum fragments.

References Cited in the file of this patent

UNITED STATES PATENTS

| | | |
|---|---|---|
| 1,927,207 | Elzemeyer et al. | Sept. 19, 1933 |
| 2,031,683 | Armstrong | Feb. 25, 1936 |
| 2,059,229 | Gregg | Nov. 3, 1936 |
| 2,428,777 | Bitzer | Oct. 14, 1947 |
| 2,430,762 | Erck | Nov. 11, 1947 |
| 2,656,118 | Chelminski | Oct. 20, 1953 |
| 2,746,603 | Blondelle | May 22, 1956 |

FOREIGN PATENTS

| | | |
|---|---|---|
| 936,441 | Germany | Dec. 15, 1955 |